(12) United States Patent
Huettner et al.

(10) Patent No.: US 9,246,547 B2
(45) Date of Patent: Jan. 26, 2016

(54) METHOD AND ARRANGEMENT FOR TRANSMITTING DATA VIA AN ELECTRIC CONDUCTOR OF A CURRENT NETWORK

(71) Applicant: SIEMENS AKTIENGESELLSCHAFT, Munich (DE)

(72) Inventors: Joerg Huettner, Hof (DE); Fabian Kurz, Munich (DE); Gerhard Metz, Munich (DE); Andreas Ziroff, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/413,729

(22) PCT Filed: Jul. 5, 2013

(86) PCT No.: PCT/EP2013/064212
§ 371 (c)(1),
(2) Date: Jan. 9, 2015

(87) PCT Pub. No.: WO2014/009260
PCT Pub. Date: Jan. 16, 2014

(65) Prior Publication Data
US 2015/0139341 A1 May 21, 2015

(30) Foreign Application Priority Data
Jul. 9, 2012 (DE) .......... 10 2012 211 916

(51) Int. Cl.
*H04B 3/54* (2006.01)

(52) U.S. Cl.
CPC ........ *H04B 3/546* (2013.01); *H04B 2203/5416* (2013.01); *H04B 2203/5433* (2013.01); *H04B 2203/5458* (2013.01); *H04B 2203/5483* (2013.01)

(58) Field of Classification Search
CPC ........... H04B 2203/00; H04B 2203/54; H04B 2203/5404; H04B 2203/5412; H04B 2203/5416; H04B 2203/5429; H04B 2203/5433; H04B 2203/5454; H04B 2203/5458; H04B 2203/5462; H04B 2203/5483; H04B 2203/5487; H04B 3/54; H04B 3/542; H04B 3/546
USPC .......................................... 375/295, 296, 316
See application file for complete search history.

(56) References Cited

U.S. PATENT DOCUMENTS

| 4,857,893 A * | 8/1989 | Carroll ........................ 340/572.7 |
| 2001/0039617 A1 * | 11/2001 | Buhrlen et al. ................ 713/185 |

(Continued)

FOREIGN PATENT DOCUMENTS

| CA | 2787328 | 3/2012 |
| JP | 2009-164924 | 7/2009 |

OTHER PUBLICATIONS

Richard McWilliam, "Electronic identification systems for asset management," Durham E—Theses, Durham University, Mar. 1, 2003, pp. 1-358 http://etheses.dur.ac.uk/3697/1/3697_1258.pdf.

(Continued)

*Primary Examiner* — Siu Lee
(74) *Attorney, Agent, or Firm* — Staas & Halsey LLP

(57) ABSTRACT

A method transmits data via an electric conductor of a current network. At least one first node and at least one second node are coupled to the electric conductor by a respective impedance-transparent coupling device. The method involves transmitting a carrier signal by the first node via the electric conductor, rectifying the transmitted carrier signal at the second node in order to supply energy to the second node, and modulating the transmitted carrier signal by the second node using a load modulation in order to transmit response data to the first node. The method is suitable in particular for low-maintenance and inexpensive sensor applications in current networks. An arrangement is used to transmit data via the electric conductor of a current network.

13 Claims, 1 Drawing Sheet

(56) References Cited

U.S. PATENT DOCUMENTS

| | | |
|---|---|---|
| 2008/0218315 A1* | 9/2008 | Bohm et al. ............... 340/10.3 |
| 2008/0303344 A1 | 12/2008 | Matsuda et al. |
| 2009/0130981 A1* | 5/2009 | Nagai et al. ............... 455/63.1 |
| 2011/0065398 A1* | 3/2011 | Liu et al. ............... 455/127.1 |
| 2013/0342326 A1* | 12/2013 | Wang et al. ............... 340/10.1 |

OTHER PUBLICATIONS

German Office Action for German Priority Patent Application No. 10 2012 211 916.7, issued Feb. 19, 2013, 7 pages.

English Language International Search Report for PCT/EP2013/064212, mailed Oct. 17, 2013, 3 pages.

* cited by examiner

METHOD AND ARRANGEMENT FOR TRANSMITTING DATA VIA AN ELECTRIC CONDUCTOR OF A CURRENT NETWORK

CROSS REFERENCE TO RELATED APPLICATIONS

This application is based on and hereby claims priority to International Application No. PCT/EP2013/064212 filed on Jul. 5, 2013 and German Application No. 10 2012 211 916.7 filed on Jul. 9, 2012, the contents of which are hereby incorporated by reference.

BACKGROUND

The present invention relates to a method and an arrangement for transmitting data via an electrical conductor of an electricity grid.

Powerline Communication (PLC) denotes the transmission of data via electrical conductors. In this case, electrical conductors, for example power lines in the building and access area, are simultaneously used for transmitting power and for transmitting data.

Application scenarios for PLC include the connection of households to the internet and home networks with data rates in the two-digit megabit range, but also measurement, control and regulatory applications in various environments, such as smart grid, or sensor applications in distribution substations.

For measurement, control and regulatory applications, low data rates are generally sufficient. Depending on the setting, however, particular demands on the safety and robustness of such an application may apply. Safety and robustness are critical criteria for the supply of power, for example, when a sensor function still needs to be ensured even if the system voltage fails. In addition, in may settings, low maintenance expenditure is important, for example in order to save costs.

In this context, there are a series of competing standards for communication on power lines, particularly for low voltage and medium voltage lines, which allow data transmission at low and medium data rates. Examples are Spread Frequency Shift Keying (S-FSK), Differential Code Shift Keying (DCSK), G3, PRIME and G.hnem. These standards use variously complex types of modulation in the longwave band, such as FSK, Spread-Spectrum or Orthogonal Frequency Division Multiplexing (OFDM). In Europe, these standards usually operate in what is known as the CENELEC band below 148.5 kHz and achieve data rates of up to 128 kbit/s, but usually the rates used are in the single-digit kilobit range. Corresponding systems are symmetrical at the physical level, that is to say that they usually have, per communication endpoint, a transmitter and a receiver in one unit, the transceiver. Transceivers communicate with one another via the channel that connects them. The power requirements for such systems based on the related art is typically a few tens of milliwatts. Low voltage lines allow power to be supplied directly from the system voltage, at least while said system voltage is applied. By contrast, medium voltage lines, in which the signal is often transported on the shield of the line, require power to be supplied externally, for example from batteries, these having a limited life and therefore meaning increased maintenance expenditure, however.

In addition, systems that are based on the cited standards require apparatuses with a high level of technical complexity, which needs to be implemented in appropriate chipsets, for example. Such chipsets require complex configuration and also a dedicated supply of power, which means that such solutions are of no interest at least for simple sensor applications.

In "Electronic Identification Systems for Asset Management", Richard Mcwilliam discloses an overview of the possibility of direct load modulation over power lines.

US 2008/303344 A1 discloses a power line communication system. In this system, apparatuses are connected to a plurality of electrical power lines. A master apparatus is connected to one of these power lines.

SUMMARY

It is one potential object to provide an improved method and an improved arrangement for transmitting data via an electrical conductor of an electricity grid.

Accordingly, the inventors propose a method for transmitting data via an electrical conductor of an electricity grid. The electrical conductor has at least one first node and at least one second node coupled to it by coupling by a respective impedance-transparent coupling device. The method comprises the transmission of a carrier signal via the electrical conductor by the first node, rectification of the transmitted carrier signal at the second node for the purpose of supplying power to the second node, and modulation of the transmitted carrier signal by the second node by load modulation for the purpose of transmitting response data to the first node.

The electricity grid can be represented by a simplified model, consisting of the electrical conductor, series components of the connecting lines of the first node and the second node and a parallel component, which, as a concentrated component, models the system access impedance.

The coupling is effected by a respective coupler or a coupling device. At the operating frequency, for example in what is known as the CENELEC band from 3 to 148.5 kHz, such a coupler needs to be impedance-transparent, that is to say that a change in the impedance at one end, for example at the second node, must correspond to the same change in the impedance at the other end, for example at the first node, in the ratio 1:N/M. This is possible through the use of series resonant circuits, for example.

The use of such couplers protects the first and second nodes by decoupling them from the system voltage. In addition, the couplers allow load modulation for the purpose of transmitting data. On account of the impedance ratios on typical low and medium voltage systems, impedance transformation is necessary, which can be effected by such couplers.

The first node is particularly in the form of a reader. The second node is in the form of a transponder, for example. Such a transponder comprises a device for modulating the carrier signal for the purpose of transmitting response data to the reader, for example by virtue of amplitude or phase modulation. In addition to the response data, the transponder can code an explicit identification (ID) into the modulated carrier signal. In addition, the transponder comprises a circuit for rectifying the carrier signal transmitted by the first node for the purpose of power generation, which means that the transponder does not require an external power supply. In addition, the transponder may comprise a memory for the explicit ID and, if need be, for further data and also an arithmetic and logic unit for generating a modulation sequence. Depending on the use of the transponder, such a second node or transponder may comprise further components, for example sensors for capturing measured values.

Load modulation is understood to mean the effect of a load change in the transponder on the amplitude or phase of the carrier signal transmitted by the reader. The transponder initiates the load change. The reader can recognize and read the response data coded in the load change.

The method allows data to be transmitted via an electrical conductor to and from nodes, such as transponders of low complexity. In particular, such a node or transponder does not require a dedicated power supply and is therefore particularly safe and robust, for example in the event of the system power supply failing. In addition, such a node or transponder can be operated virtually maintenance-free on account of its low design complexity.

A further advantage is that such a node or transponder can involve the use of chips from conventional wireless identification systems, such as RFID chips, which are available inexpensively in large numbers. The method is particularly suitable for low-maintenance and inexpensive sensor applications.

The classic communication link, in which each transmitter actively supplies power to the transmission channel, is circumvented in the proposed method through the use of the load modulation. This is made possible by virtue of a special design for the link to the transmission medium, which transmits the load changes at the transponder end to the reader without prejudice. This allows communication to be conducted at an endpoint that has very low complexity and no dedicated power supply and hence is operated virtually maintenance-free.

A further advantage of the proposed method lies in the possibility of being able to couple the transponder at zero potential, for example using an inductive coupler. An additional power supply for the transponder is not necessary.

An additional advantage of the proposed method is that chips from popular wireless identification systems can be used. Particularly at the sensor end, very cheap components are therefore available.

In embodiments, the method also comprises demodulation of the carrier signal modulated by the load modulation by the first node for the purpose of receiving the response data.

The first node can also be considered to be a reader for response data that are transmitted by a sensor or switch in the form of a transponder, for example. The reader produces the carrier signal in the form of a sinusoidal signal in the long-wave band, for example, and demodulates the amplitude or phase modulation occurring as a result of load change on the transponder.

Hence, it is possible to use the electrical conductor to transmit response data to the first node, for example from a node or transponder in the form of a sensor or switch.

In further embodiments of the method, a distance between the first node and the second node is ascertained on the basis of the reception of the response data. Expediently, this distance is ascertained by propagation time measurement, that is to say by measurement of a signal propagation time.

In this case, the propagation time of the transmitted carrier signal is measured from the instant of transmission, for example, said propagation time elapsing until the carrier signal modulated by the second node arrives at the first node. Taking account of the physical properties of the electrical conductor, simple and inexpensive distance measurement is thus possible in the electricity grid remotely.

In further embodiments, the method also comprises modulation of the transmitted carrier signal by a further second node by further load modulation for the purpose of transmitting further response data to the first node.

This allows the use of any number of nodes or transponders, for example as sensors or switches in the electricity grid. In this case, each sensor or switch can be explicitly identified by a load modulation that characterizes it.

In further embodiments, the method also comprises demodulation of the carrier signal modulated by the further load modulation by the first node for the purpose of receiving the further response data.

In this way, the response data from the various nodes or transponders, such as sensors or switches, in the electricity grid can be received and used by the first node.

In further embodiments of the method, a distance between the second node and the further second node is ascertained on the basis of the reception of the response data and the further response data. Expediently, this distance is ascertained by propagation time measurement, that is to say by measurement of a signal propagation time.

This allows simple and inexpensive distance measurement in the electricity grid remotely using a plurality of nodes or transponders coupled to the electrical conductor.

In further embodiments of the method, the load modulation and the further load modulation are effected by switching between various load impedances.

The second node or transponder changes over between various load impedances and hence causes a corresponding impedance change at the input of the first node.

In further embodiments, the method also comprises modulation of the carrier signal by modulation for the purpose of transmitting control data by the first node.

Hence, the first node or the reader can transmit control data to the switch or transponder when required. By way of example, control data may contain switching instructions for switches, so that, by way of example, switching on and off or time control for an appliance connected to the electrical conductor is possible remotely.

In further embodiments, the method also comprises demodulation of the carrier signal modulated by the modulation for the purpose of transmitting control data by the second node for the purpose of receiving the control data.

For this purpose, the second node or transponder may comprise a circuit for demodulating and/or decoding control data from the first node. Hence, a transponder or switch in the electricity grid can receive and if need be convert control data from the first node or reader.

In further embodiments of the method, the coupling by the respective impedance-transparent coupling device to the electrical conductor is effected at zero potential.

This is accomplished through the use of inductive couplers, for example. Such couplers are used for insulation between the first node or reader and/or the second node or transponder, on the one hand, and the AC voltage in the electricity grid, on the other hand.

In further embodiments of the method, the carrier signal is filtered by the respective impedance-transparent coupling device for the purpose of rejecting interference signals.

Hence, the carrier signal is filtered in the frequency range that is relevant to the transmission in terms of interfering signal components. This is potentially necessary because there may be a multiplicity of interference signals on the transmission medium that need to be rejected in order for the method to work correctly.

In further embodiments of the method, the electrical conductor is embodied as a high voltage line or maximum voltage line.

This allows the transmission of data via an electrical conductor via high voltage lines or maximum voltage lines too. In further embodiments, the response data comprise a piece of sensor information.

By way of example, sensor information can describe ambient conditions, such as temperature, humidity or air pressure. In addition, sensor information can describe line parameters such as current intensity, impedance or distance statements. The sensor data can be coded into the carrier signal by modulating the carrier signal. This allows many and diverse, inexpensive and low-maintenance sensor applications remotely, for example.

In addition, an arrangement for transmitting data via an electrical conductor of an electricity grid is proposed. The arrangement comprises a first node and at least one second node, wherein the first node and the second node are coupled to the electrical conductor by coupling by a respective impedance-transparent coupling device, wherein the first node comprises a transmitter for transmitting a carrier signal via the electrical conductor, wherein the second node comprises a rectifier for rectifying the transmitted carrier signal for the purpose of supplying power to the second node, and wherein the second node comprises a modulator for modulating the transmitted carrier signal by load modulation for the purpose of transmitting response data.

The transmitter, rectifier and modulator may be implemented using hardware and/or also software. In the case of a hardware implementation, these units may be in the form of an apparatus or in the form of part of an apparatus, for example in the form of a computer or in the form of a microprocessor. In the case of a software implementation, the respective units may be in the form of a computer program product, in the form of a function, in the form of a routine, in a form of part of a program code or in the form of an executable object.

Further possible implementations also comprise combinations that are not explicitly cited for method, features or embodiments of the method or of the arrangement that are described hereinabove or hereinbelow for the exemplary embodiments. In this case, a person skilled in the art would also add or modify individual aspects as improvements or additions to the respective basic form of the invention.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
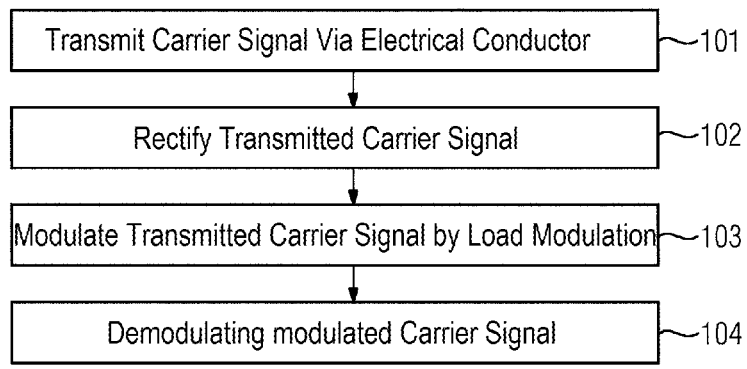
FIG. 1 shows a schematic flowchart for an exemplary embodiment of a method for transmitting data via an electrical conductor of an electricity grid.

Reference will now be made in detail to the preferred embodiments of the present invention, examples of which are illustrated in the accompanying drawings, wherein like reference numerals refer to like elements throughout.

In the figures, elements that are the same or have the same function have been provided with the same reference symbols unless stated otherwise.

Figure 2:
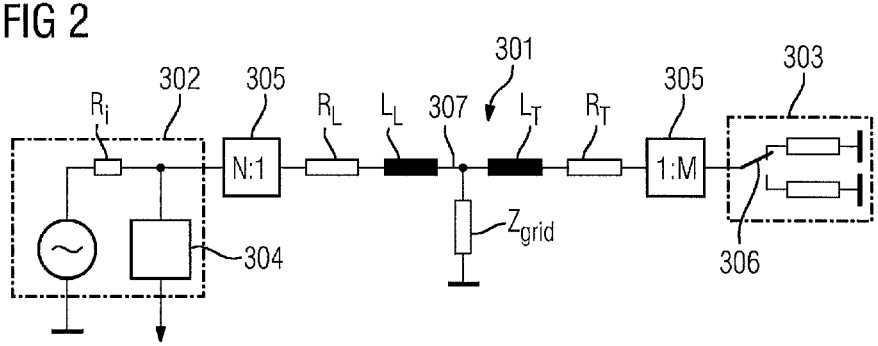
FIG. 2 shows a schematic block diagram of an arrangement for transmitting data via an electrical conductor of an electricity grid.

FIG. 1 shows a schematic flowchart for an exemplary embodiment of a method for transmitting data via an electrical conductor 307 of an electricity grid. The electricity grid and an appropriate arrangement 301 for carrying out the method are shown in FIG. 2.

First, a carrier signal is transmitted 101 via the electrical conductor 307 by the first node 302.

Second, the transmitted carrier signal is rectified 102 at the second node 303 for the purpose of supplying power to the second node 303.

Third, the transmitted carrier signal is modulated 103 by the second node 303 by load modulation for the purpose of transmitting response data to the first node 302.

Fourth, the carrier signal modulated by the load modulation is demodulated 104 by the first node 302 for the purpose of receiving the response data.

The first node 302 is also referred to as a reader. The response data from the second node 303 can alternatively or additionally also be demodulated by a further reader 302 in the electricity grid.

The response data from the second node 303 are used for ascertaining the distance between the reader 302 and the second node 303, for example.

The second node 303 may be embodied as a transponder, switch or sensor, for example. It is possible for a plurality of second nodes 303 to modulate the carrier signal transmitted by the reader 302. The reader 302 can therefore demodulate further response data from a further second node 303, for example. In this case, each transponder 303 uses load modulation that characterizes it. It is possible to code an ID number that explicitly identifies the respective transponder 303 into the modulated carrier signal.

For the case of two second nodes 303 that transmit response data to the reader 302, the reader 302 can ascertain the distance between the two second nodes 303.

It is possible for the reader 302 to modulate the carrier signal in order to transmit control data to the second node 303. Alternatively, the control data may also be directed to a plurality of or all second nodes 303 in the electricity grid. The second node or nodes 303 demodulate the carrier signal modulated for the purpose of transmitting control data in a demodulation for the purpose of receiving the control data.

The communication from the reader 302 to the transponder 303, for example the transmission of control data from the reader 302 to the transponder 303, is effected by modulating the carrier signal; and the return path from the transponder 303 to reader 302, for example the transmission of response data from the transponder 303 to the reader 302, is effected by load modulation. In this case, all types of modulation are possible, for example amplitude modulation or phase modulation.

FIG. 2 shows a schematic block diagram of an arrangement 301 for transmitting data via an electrical conductor 307 of an electricity grid.

The electricity grid comprises an electrical conductor 307 having series components $R_{L/T}$, $L_{L/T}$ in the connecting lines from a first node or reader 302 and a second node or transponder 303 and also a parallel component $Z_{grid}$, which, as a concentrated component, models the system access impedance. The reader 302 comprises a device 304 for modulating and demodulating the carrier signal. By way of example, the transponder 303 comprises a switch 306 for modulating the carrier signal. In addition, the arrangement 301 comprises two coupling devices or couplers 305 that, by way of example, firstly transform down the impedance at the reader 302 to the impedance level of the electrical conductor 307 in the ratio N:1 and, by way of example, secondly transform up the line impedance in the ratio 1:M to the impedance of the transponder 303.

Figure 3:
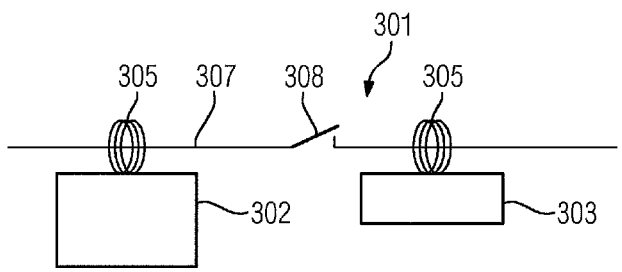
FIG. 3 shows a schematic block diagram of an exemplary embodiment of an arrangement for transmitting data via an electrical conductor of an electricity grid.

FIG. 3 shows a schematic block diagram of an exemplary embodiment of an arrangement 301 for transmitting data via the electrical conductor 307 of an electricity grid.

In this case, the electrical conductor 307 is a medium voltage line. The arrangement shown in FIG. 3 is used for electricity grid monitoring and particularly for switch position detection. For the purpose of monitoring switch positions in medium voltage systems, a transponder or sensor 303 is fitted downstream of a switch 308 as seen from the reader 302. The reader 302 and the transponder 303 are coupled to the electrical conductor 307 by coupling devices 305. The reader 302 can recognize whether the transponder 303 is available, when the switch 308 is closed, or is unavailable, when the switch is open.

A further conceivable use for the proposed method and the proposed arrangement is in a smart multiple receptacle block. Such a multiple receptacle block is equipped with a reader 302, and all appliances to be connected contain a transponder 303. As soon as an appliance is connected to the multiple receptacle block, the reader 302 reads the transponder 303 of the appliance. The appliance is identified by an explicit transponder ID number. This allows the multiple receptacle block to ascertain what loads are connected and, by way of example, to react to a threat of overload, for example by transmitting control signals for the purpose of shutting down one or more appliances.

In addition, the use of the proposed method and the proposed arrangement in smart homes applications is conceivable, for example for time control for particular large loads so that they are not operated at times of heavy network loading. By way of example, time control is effected by virtue of the transmission of control data by the reader 302 for the purpose of switching appliances on and off.

A further conceivable use for the proposed method and the proposed arrangement is the control of building electronics. Components in the household, for example lamp dimmers, air conditioning installation or heating, are controlled from any accessible location in the same electricity grid. In this case, the reader 302 is incorporated in an air conditioning installation, for example. A transponder 303 having switching inputs at a receptacle outlet or in a light switch is used for the control.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for transmitting data between a first node and a plurality of second nodes via an electrical conductor of an electricity grid, the second nodes comprising a first source second node and a second source second node, the method comprising:
   coupling the electrical conductor to the first node by a first impedance-transparent coupling device;
   coupling the electrical conductor to the second nodes by at least one second impedance-transparent coupling device;
   transmitting a carrier signal from the first node via the electrical conductor;
   rectifying the carrier signal at each second node to supply power to the second nodes;
   transmitting first response data to the first node by preparing a first modulated carrier signal, the first modulated carrier signal being prepared by modulating the carrier signal at the first source second node using load modulation; and
   transmitting second response data to the first node by preparing a second modulated carrier signal, the second modulated carrier signal being prepared by modulating the carrier signal at the second source second node using load modulation.

2. The method as claimed in claim 1, further comprising:
   demodulating the first modulated carrier signal at the first node to receive the first response data.

3. The method as claimed in claim 2, wherein a distance between the first node and the first source second node is ascertained based on the first response data.

4. The method as claimed in claim 2, further comprising:
   demodulating the second modulated carrier signal at the first node to receive the second response data.

5. The method as claimed in claim 4, wherein a distance between the first source second node and the second source second node is ascertained based on the first and second response data.

6. The method as claimed in claim 1, wherein load modulation is performed at the second nodes by switching between different load impedances.

7. The method as claimed in claim 1, further comprising:
   modulating the carrier signal at the first node to transmit control data.

8. The method as claimed in claim 7, further comprising:
   receiving the control data by demodulating the carrier signal modulated by the first node, the carrier signal being demodulated by at least one of the second nodes.

9. The method as claimed in claim 1, wherein
   the impedance-transparent coupling devices are coupled to the electrical conductor at zero potential.

10. The method as claimed in claim 1, wherein
    the carrier signal is filtered by at least the second impedance-transparent coupling device to reject interference signals.

11. The method as claimed in claim 1, wherein the electrical conductor is a high voltage line or a maximum voltage line.

12. The method as claimed in claim 1, wherein the first and second response data comprise pieces of sensor information.

13. A system to transmit data between a first node and a plurality of second nodes, via an electrical conductor of an electricity grid, the second nodes comprising a first source second node and a second source second node, the system comprising:
    a first impedance-transparent coupling device to couple the first node to the electrical conductor;
    at least one second impedance-transparent coupling device to couple the second nodes to the electrical conductor;
    a transmitter provided at the first node to transmit a carrier signal via the electrical conductor;
    a first rectifier to rectify the carrier signal to supply power to the first source second node;
    a first modulator provided at the first source second node to modulate the carrier signal using load modulation, to prepare a first modulated carrier signal to transmit first response data;
    a second rectifier to rectify the carrier signal to supply power to the second source second node; and
    a second modulator provided at the second source second node to modulate the carrier signal using load modulation, to prepare a second modulated carrier signal to transmit second response data.

* * * * *